United States Patent
Reiter (12)

(10) Patent No.: US 10,256,746 B2
(45) Date of Patent: Apr. 9, 2019

(54) LOW-VOLTAGE DISCHARGE AND ACTUATION CIRCUIT FOR THE TRACTION CONVERTER OF A VEHICLE

(71) Applicant: Bayerische Motoren Werke Aktiengesellschaft, Munich (DE)

(72) Inventor: Michael Reiter, Augsburg (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/914,892

(22) Filed: Mar. 7, 2018

(65) Prior Publication Data

US 2018/0198365 A1    Jul. 12, 2018

Related U.S. Application Data

(63) Continuation of application No. PCT/EP2016/067922, filed on Jul. 27, 2016.

(30) Foreign Application Priority Data

Sep. 9, 2015 (DE) .................. 10 2015 217 175

(51) Int. Cl.
*H02M 7/5387* (2007.01)
*H02P 27/06* (2006.01)
(Continued)

(52) U.S. Cl.
CPC .......... *H02M 7/5387* (2013.01); *H02M 1/32* (2013.01); *H02P 27/06* (2013.01);
(Continued)

(58) Field of Classification Search
CPC ............................ H02M 7/53871; H02M 1/32
See application file for complete search history.

(56) References Cited

U.S. PATENT DOCUMENTS

| 2012/0091933 A1 | 4/2012 | Inamura et al. |
| 2014/0191700 A1* | 7/2014 | Eberlein ............... B60L 3/0061 |
| | | 318/504 |
| 2016/0105092 A1* | 4/2016 | Takakura ............ B60L 11/1803 |
| | | 318/519 |

FOREIGN PATENT DOCUMENTS

| DE | 10 2004 057 693 A1 | 6/2006 |
| DE | 10 2011 081 173 A1 | 2/2013 |

(Continued)

OTHER PUBLICATIONS

PCT/EP2016/067922, International Search Report dated Oct. 25, 2016 (Three (3) pages).

(Continued)

*Primary Examiner* — Kyle J Moody
(74) *Attorney, Agent, or Firm* — Crowell & Moring LLP

(57) ABSTRACT

An actuation circuit for an inverter includes a direct voltage converter to convert direct current at a first voltage into direct current at an intermediate circuit voltage, and a driver unit that generates inverter control signals, based on direct current at the intermediate circuit voltage, to switch elements of the inverter. The actuation circuit also includes a discharge unit supplied with direct current at the intermediate circuit voltage, where the discharge unit switches, in response to a discharge control signal, a discharge resistor in parallel to an output of the direct voltage converter, and a control unit that is supplied with direct current at the intermediate circuit voltage. The control unit is configured to generate, for the discharging of the back-up capacitor, a discharge control signal that causes the discharge unit to switch the discharge resistor in parallel to the output of the direct voltage converter.

17 Claims, 2 Drawing Sheets

(51) Int. Cl.
 *H02M 1/32* (2007.01)
 *H02P 3/22* (2006.01)
 *H02M 1/00* (2006.01)

(52) U.S. Cl.
 CPC ............... *H02M 2001/0006* (2013.01); *H02M 2001/322* (2013.01); *H02P 3/22* (2013.01)

(56) References Cited

FOREIGN PATENT DOCUMENTS

DE 11 2014 002 281 T5 1/2016
WO WO 2015/004948 A1 1/2015

OTHER PUBLICATIONS

German Search Report issued in German counterpart application No. 10 2015 217 172.2 dated May 19, 2016, with Statement of Relevancy (Seven (7) pages).

* cited by examiner

LOW-VOLTAGE DISCHARGE AND ACTUATION CIRCUIT FOR THE TRACTION CONVERTER OF A VEHICLE

CROSS REFERENCE TO RELATED APPLICATIONS

This application is a continuation of PCT International Application No. PCT/EP2016/067922, filed Jul. 27, 2016, which claims priority under 35 U.S.C. § 119 from German Patent Application No. 10 2015 217 175.2, filed Sep. 9, 2015, the entire disclosures of which are herein expressly incorporated by reference.

BACKGROUND AND SUMMARY OF THE INVENTION

The invention relates to an actuation circuit for an inverter for the operation of an electric drive motor of a vehicle, specifically of a road vehicle.

A vehicle with an electric drive system comprises a first energy store for the storage of electrical energy for the operation of an electric drive motor of the vehicle. The first energy store delivers a current at a relatively high first voltage (e.g. 300-400 V). Moreover, the vehicle typically comprises an on-board system, which operates at a relatively low second voltage (e.g. 12-14 V), and is employed for the supply of electrical energy to electrical loads such as, for example, an infotainment system. The first voltage can be designated as a HV (high) voltage, and the second voltage as a LV (low) voltage.

For the operation of the electric drive motor, the vehicle comprises an inverter, specifically a three-phase AC inverter, which is designed, from a DC (direct current) supplied by the first energy store, to generate an AC (alternating current), specifically a three-phase alternating current. The inverter comprises one or more half bridges with switching elements, specifically transistors such as, e.g. IGBTs (insulated-gate bipolar transistors), which are alternately switched.

The vehicle comprises an actuation circuit, which is designed to deliver inverter control signals for the individual switching elements of the inverter. The actuation circuit comprises driver circuits, which are designed to generate inverter control signals for the individual switching elements (specifically gate signals for IGBTs). To this end, an inverter control signal assumes a first potential (e.g. of 15 V) in order to close a switching element, and a second potential (e.g. of −7 V) in order to open the switching element. The first potential and the second potential can be generated from an intermediate circuit voltage, which typically lies between the first voltage and the second voltage (e.g. at 32 V).

In general, the actuation circuit further comprises a control unit, which is designed inter alia to ensure the transition of an on-board system of the vehicle, together with the inverter, to a safe condition (e.g. in the event of an accident situation). The control unit can also execute monitoring functions. It can thus be ensured, after the expiry of a predefined time interval (e.g. of 5 seconds), that no further voltages are present on the on-board system which exceed a predefined contact threshold (e.g. of 60 V).

The present document addresses the technical object of providing a cost-effective actuation circuit which permits a reliable transition of the on-board system to a safe condition.

The object is fulfilled by the independent claims. Advantageous forms of embodiment are described inter alia in the dependent claims.

According to one aspect, an actuation circuit is described for an inverter, specifically for a three-phase AC inverter. The inverter is designed to convert a direct current at a first voltage (specifically a HV voltage) from an electrical energy store (specifically from a HV energy store) into an alternating current (specifically into a three-phase alternating current), by means of which an electrical machine (e.g. a synchronous machine) of a vehicle is operated. Moreover, a back-up capacitor is arranged in parallel with an input of the inverter, in order to ensure that a stable input voltage is present on the input of the inverter.

The actuation circuit comprises a direct voltage converter (or DC/DC converter), which is designed to convert a direct current at a first voltage (sourced directly from the HV energy store) into a direct current at an intermediate circuit voltage (e.g. at 32 V). The actuator circuit further comprises a driver unit which is designed, on the basis of the direct current at the intermediate circuit voltage, to generate inverter control signals for switching elements of the inverter (specifically for IGBTs). The driver unit is thus supplied directly with electrical energy from the HV energy store via the direct voltage converter, thereby permitting a high degree of efficiency in the actuation circuit. Moreover, by the provision of a direct supply from the HV energy store, a galvanic isolation of the supply to the driver unit can be omitted.

The actuation circuit further comprises a discharge unit, which is supplied with direct current at the intermediate circuit voltage and is designed, in response to a discharge control signal, to switch a discharge resistor in parallel to an output of the direct voltage converter. To this end, the discharge unit can incorporate a discharge switch, which can be controlled by means of the discharge control signal and is arranged e.g. in series with the discharge resistor, in a parallel connection to the output of the direct voltage converter. By the closing of the discharge switch, the discharge resistor can be parallel-connected to the output of the direct voltage converter.

Moreover, the actuation circuit comprises a control unit (and/or monitoring unit) which is also supplied with the direct current at the intermediate circuit voltage and is designed, for the discharging of the back-up capacitor, to generate a discharge control signal, which causes the discharge unit to switch the discharge resistor in parallel to the output of the direct voltage converter. By the supply of the discharge unit and the control unit with the intermediate circuit voltage, a galvanic isolation of a data link (for the discharge control signal) between the discharge unit and the control unit can be omitted, thereby reducing the costs of the actuation circuit.

Overall, the actuation circuit permits an active discharging of the back-up capacitor via the direct voltage converter (together with the associated conversion losses) and via the discharge resistor, which is rated for the intermediate circuit voltage (together with the associated ohmic losses). This permits a reliable and cost-effective transition of the on-board system of a vehicle to a safe condition.

The control unit can be designed to determine that the transition of the back-up capacitor to a safe condition is required (e.g. in response to an instruction generated by a control device, externally to the actuation circuit). In response to the instruction, the control unit can generate the discharge control signal, thus resulting in the active discharging of the back-up capacitor. The control unit can moreover be designed, in response to the instruction, to cause the driver unit to generate inverter control signals, by means of which the windings of the electrical machine are short-circuited (thereby preventing the uncontrolled injection of electrical energy from the electrical machine into the HV intermediate circuit). To this end, e.g. the low-side switching elements of the half bridges of the inverter can be transiently switched to a closed state. The transition of the on-board system, with the back-up capacitor and the inverter, to a safe condition can thus be reliably achieved.

The back-up capacitor and the inverter are typically connected to the electrical energy store via at least one contactor. The control unit can be designed (only) to generate the discharge signal after the at least one contactor has been opened. The tapping of a discharge current from the energy store, and the associated heat-up, can thus be prevented.

The direct voltage converter can be designed to limit and/or regulate the direct current on the output of the direct voltage converter to a predefined maximum current. Reliable active discharging can thus be ensured. Specifically, an excessive heat-up of components in the on-board system of the vehicle can be prevented.

The actuation circuit can comprise one or more data interfaces with one or more components (specifically control devices) which are external to the actuation circuit. These components can be supplied by a LV on-board system (e.g. from a 12/14 V on-board system). The one or more data interfaces can be provided with a galvanic isolating device, for the purposes of protection. However, the number of data interfaces, and the quantity of electrical energy flowing therein, is typically small, such that galvanic isolation of the data interfaces can be achieved in a cost-effective manner.

The control unit can be implemented in an effective manner on a programmable integrated circuit, specifically on a complex programmable logic device, or CPLD for short.

The actuation circuit can further comprise a linear controller, which is designed to generate a supply current at a supply voltage for the control unit from the direct current at the intermediate circuit voltage. The supply voltage thereby can be e.g. 3 V or lower.

The driver unit can comprise at least one transformer circuit which is designed, from the direct current at the intermediate circuit voltage, to generate different potentials (e.g. +15 V and −7 V) for at least one inverter control signal. Electrical energy for the inverter control signals can thus be generated from the direct current at the intermediate circuit voltage by means of transformer circuits.

According to a further aspect, an on-board system is described for a vehicle which is propelled by an electrical machine. The on-board system comprises an electrical energy store (e.g. a lithium-ion accumulator), which is designed to deliver a direct current at a first voltage. The on-board system further comprises an inverter, which is designed to convert the direct current at the first voltage into an alternating current, by means of which the electrical machine is operated, and a back-up capacitor, which is arranged in parallel with one input of the inverter. The on-board system moreover comprises an actuation circuit for the inverter, as described in the present document.

According to a further aspect, a vehicle is described (specifically a road vehicle, e.g. a passenger vehicle, a heavy goods vehicle or a motorcycle), which comprises an on-board system described in the present document.

It should be observed that the devices and systems described in the present document can be employed both in isolation, and in combination with other devices and systems described in the present document. Moreover, any aspects of the devices and systems described in the present document can be mutually combined in a variety of ways. Specifically, the characteristics of the claims can be mutually combined in a variety of ways.

Other objects, advantages and novel features of the present invention will become apparent from the following detailed description of one or more preferred embodiments when considered in conjunction with the accompanying drawings.

BRIEF DESCRIPTION OF THE DRAWINGS

The invention is described in greater detail hereinafter with reference to exemplary embodiments, in which.

DETAILED DESCRIPTION OF THE DRAWINGS

Figure 1:
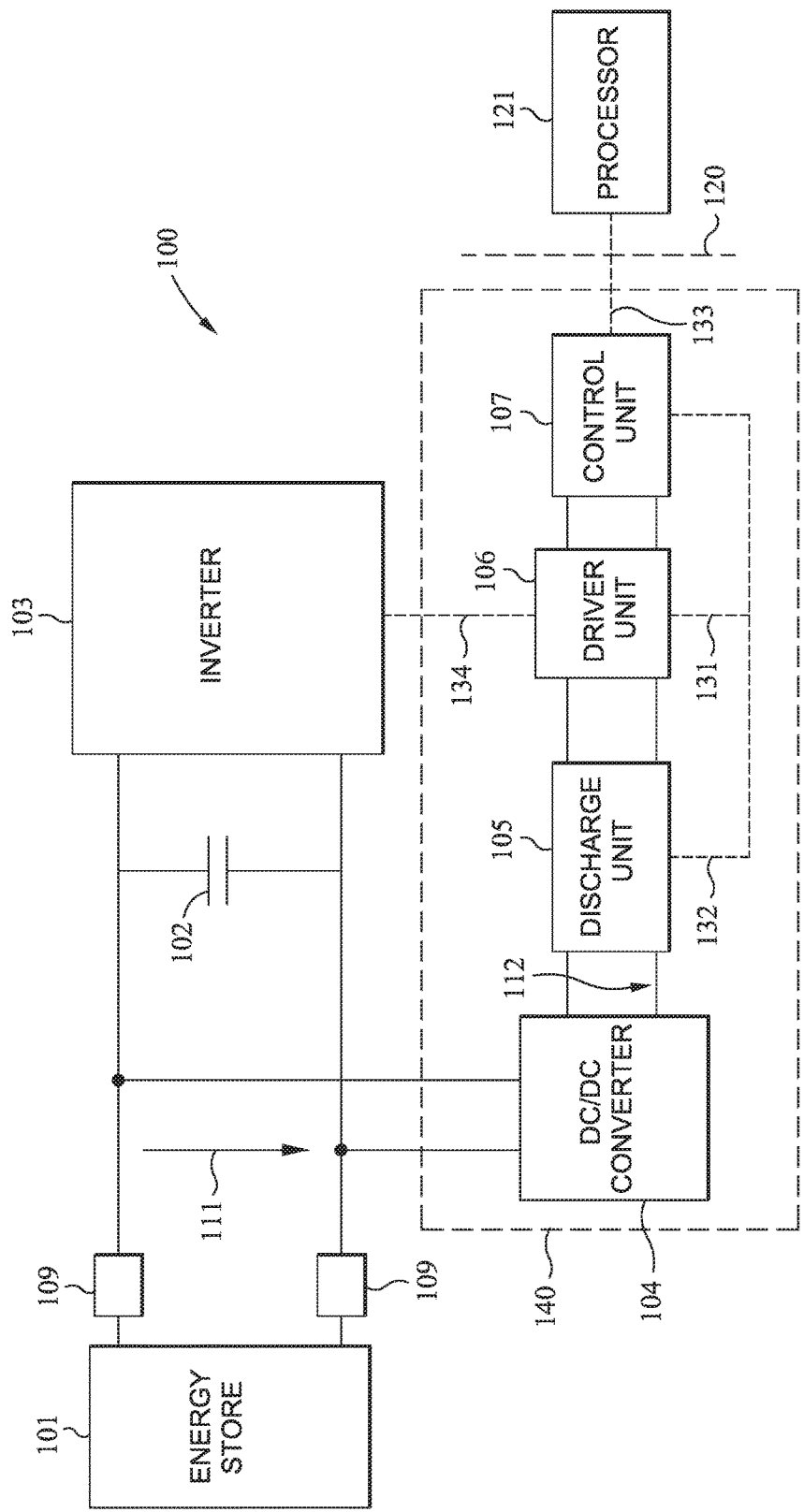
FIG. 1 shows exemplary components of an on-board electrical system of a vehicle.

As indicated above, the present document addresses the provision of a cost-effective and reliable actuation circuit for an inverter in a vehicle. In this regard, FIG. 1 shows exemplary components of an on-board electrical system 100 of a vehicle, having different voltage levels. The on-board system 100 comprises an electrical energy store 101, which is designed to supply electrical energy for the operation of an electrical machine. Electrical energy is delivered at a first voltage 111 (also described as the HV voltage). The on-board system 100 further comprises an inverter 103, which is designed to generate an alternating current from the stored energy, specifically a three-phase alternating current, for the operation of the electrical machine (not represented). Moreover, the on-board system typically comprises a back-up capacitor 102 on the input of the inverter 103.

The on-board system 100 additionally comprises an actuation circuit 140, which is designed to control the inverter 103, to generate the alternating current, and to ensure the transition of the inverter 103 or the on-board system 100 to a safe condition, if required (e.g. in the event of an accident). The actuation circuit 140 comprises a DC/DC converter 104, which is designed to convert electrical energy at the first voltage 111 into electrical energy at an intermediate circuit voltage 112. An exemplary DC/DC converter 104 is a buck converter.

The actuation circuit 140 further comprises a driver unit 106 having driver circuits for the individual switching elements of the inverter 103. The driver unit 106 is supplied with electrical energy at the intermediate circuit voltage 112, in order to generate potentials for the inverter control signals 134 required for the switching elements. The driver unit 106 is thus supplied directly by the conversion of energy from the HV energy store 101, by means of the DC/DC converter 104 (specifically with no intermediate conversion to a LV voltage, e.g. of 12-14 V). This is advantageous with respect to the energy efficiency of the actuation circuit 140, and with respect to the omission of a LV converter for the supply of electrical energy at the LV voltage.

The actuation circuit 140 further comprises a control unit 107, which is designed to ensure the transition of the on-board system 100 to a safe condition, if required. The on-board system 100 typically incorporates contactors (e.g. relays) 109, which can be opened if required in order to isolate the energy store 101 from the on-board system. The control unit 107 can moreover be designed to initiate the simultaneous closing by the driver unit 106 (by means of a driver control signal 131) of all the low-side switching elements of the half bridges of the inverter 103, such that the electrical machine generates no further torque.

Alternatively or additionally, the control unit 107 can be designed to initiate an active discharging of the inverter 103 and/or of the back-up capacitor 102. To this end, the actuation circuit 140 can incorporate a discharge unit 105. The discharge unit 105 can comprise a discharge resistor which, by means of a discharge switch, is switched in parallel to the output of the DC/DC converter 104. The control unit 107 can thus cause the discharge unit 105 (by means of a discharge control signal 132) to switch the discharge resistor parallel to the output of the DC/DC converter 104. As a result (when the contactors 109 are open), the back-up capacitor 102 is discharged via the DC/DC converter 104 and via the discharge resistor. Accordingly, conversion losses in the DC/DC converter 104 and ohmic losses in the discharge resistor result in the decay of energy stored in the back-up capacitor 102. The DC/DC converter 104 can moreover be operated in an active discharge mode, by means of which the current flowing in the DC/DC converter 104 is limited (specifically, the DC/DC converter 104 can be operated in a "current control mode"). Excessive rises in the discharge current can thus be prevented in an efficient manner. Moreover, an arrangement of the discharge unit 105 on the output of the DC/DC converter 104 is advantageous, as this permits the employment of discharge resistors which are rated for lower voltage (and are thus more cost-effective).

The control unit 107 can be implemented e.g. on a CPLD (complex programmable logic device). In the light of the fact that the control unit 107, the driver unit 106 and the discharge unit 105 are supplied with the intermediate circuit voltage 112, no galvanic isolation of the individual units 107, 106, 105 is required. Moreover, no galvanic isolation of the drive unit 106 from the inverter 103 is required. Costs associated with the actuation circuit 140 can be reduced accordingly. Where applicable, galvanic isolation 120 is only required for the transmission of digital signals 133 (e.g. via a serial peripheral interface (SPI)) to an external processor 121 (which is supplied e.g. by the 12/14 V on-board system).

Figure 2:
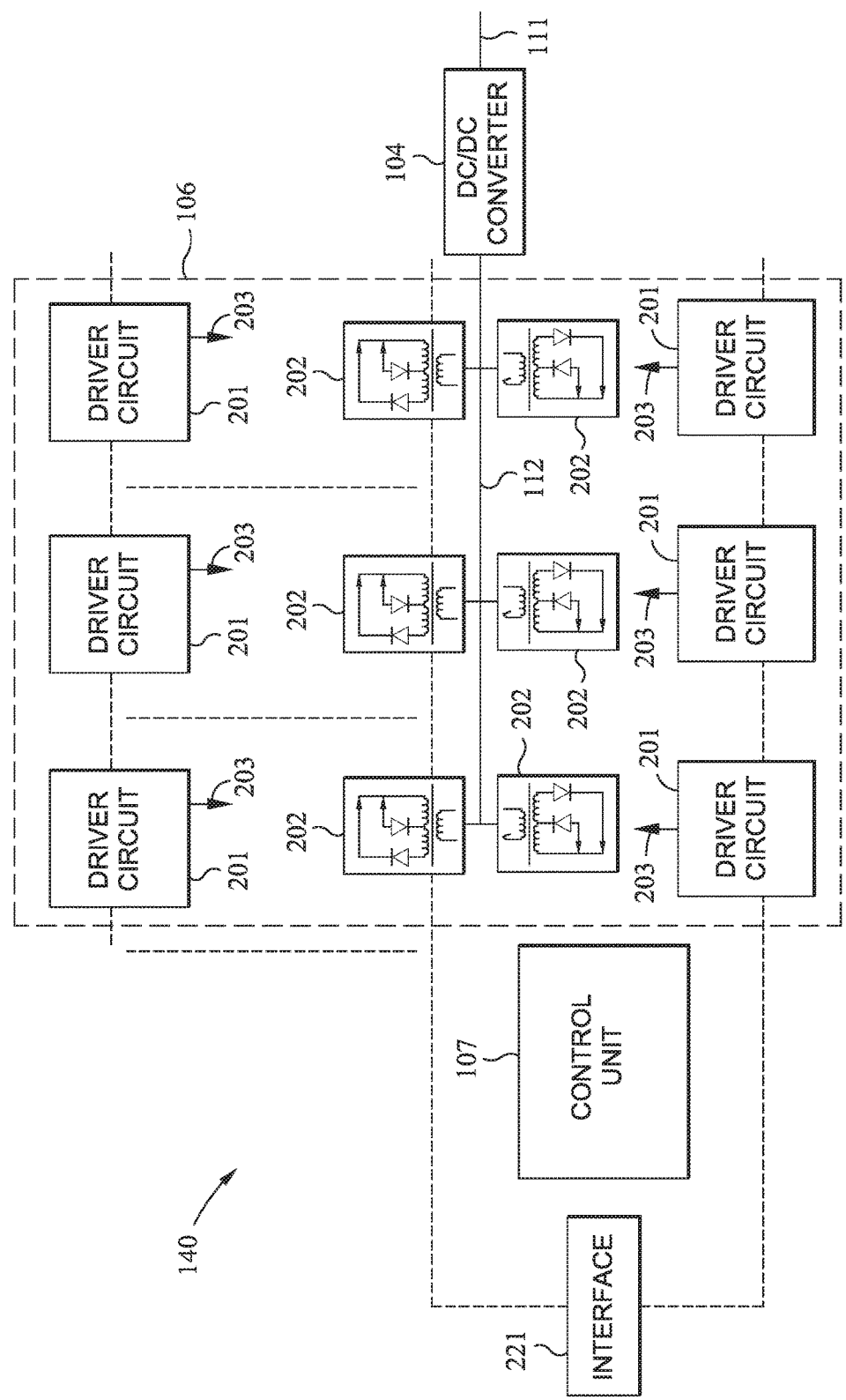
FIG. 2 shows exemplary components of an actuation circuit for an inverter.

FIG. 2 shows further details of an exemplary actuation circuit 140. Specifically, FIG. 2 shows further details of a driver unit 106, comprising a plurality of driver circuits 201 for the generation of inverter control signals 134, 203 for the corresponding plurality of switching elements of the inverter 103. The driver unit 106 moreover comprises transformer circuits 202 which are designed to generate the requisite potentials (e.g. +15 V and −7 V) from the intermediate circuit voltage 112. FIG. 2 additionally represents, in an exemplary manner, a galvanically decoupled interface 221 for the transmission of digital signals 133 between an external processor 121 and the control unit 107.

The actuation circuit 140 described in the present document is advantageous, in that it requires no, or at least a reduced number, of galvanically-isolating components. Moreover, by means of the direct supply from the HV energy store 101, a (potentially redundant) supply from a LV on-board system can be omitted. The arrangement described of a discharge unit 105, in combination with a DC/DC converter 104, additionally permits a regulated, i.e. a controlled and reliable discharging of the back-up capacitor 102. Moreover, by means of the arrangement described, the costs of the actuation circuit 140 can be reduced.

The present invention is not restricted to the exemplary embodiments represented. Specifically, it should be observed that the description and the figures only illustrate the principle of the proposed devices and systems.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An actuation circuit for an inverter, wherein the inverter is configured to convert direct current at a first voltage from an electrical energy store into alternating current by which an electrical machine of a vehicle is operated, wherein a back-up capacitor is arranged in parallel with an input of the inverter, and wherein the actuation circuit comprises:
   a direct voltage converter configured to convert direct current at the first voltage into direct current at an intermediate circuit voltage;
   a driver unit configured to generate, based on direct current at the intermediate circuit voltage, inverter control signals to switch elements of the inverter, and wherein the driver unit comprises at least one transformer circuit which is configured to generate, from direct current at the intermediate circuit voltage, different potentials for at least one of the inverter control signals;
   a discharge unit supplied with direct current at the intermediate circuit voltage, wherein the discharge unit is configured to switch, in response to a discharge control signal, a discharge resistor in parallel to an output of the direct voltage converter; and
   a control unit supplied with direct current at the intermediate circuit voltage, wherein the control unit is configured to generate, for the discharging of the back-up capacitor, a discharge control signal that causes the discharge unit to switch the discharge resistor in parallel to the output of the direct voltage converter.

2. The actuation circuit as claimed in claim 1, wherein the control unit is configured to:
   determine that the transition of the back-up capacitor to a safe condition is required; and
   generate the discharge control signal in response to an instruction.

3. The actuation circuit as claimed in claim 2, wherein the control unit is configured to cause, in response to the instruction, the driver unit to generate the inverter control signals, by means of which windings of the electrical machine are short-circuited.

4. The actuation circuit as claimed in claim 2, wherein:
   the back-up capacitor and the inverter are connected to the electrical energy store via at least one contactor; and
   the control unit is configured to generate the discharge control signal after the at least one contactor has been opened.

5. The actuation circuit as claimed in claim 3, wherein:
   the back-up capacitor and the inverter are connected to the electrical energy store via at least one contactor; and
   the control unit is configured to generate the discharge control signal after the at least one contactor has been opened.

6. The actuation circuit as claimed in claim 1, wherein the direct voltage converter is configured to at least one of limit and regulate direct current on the output of the direct voltage converter to a predefined maximum current.

7. The actuation circuit as claimed in claim 2, wherein the direct voltage converter is configured to at least one of limit and regulate direct current on the output of the direct voltage converter to a predefined maximum current.

8. The actuation circuit as claimed in claim 3, wherein the direct voltage converter is configured to at least one of limit and regulate direct current on the output of the direct voltage converter to a predefined maximum current.

9. The actuation circuit as claimed in claim 4, wherein the direct voltage converter is configured to at least one of limit and regulate direct current on the output of the direct voltage converter to a predefined maximum current.

10. The actuation circuit as claimed in claim 1, wherein the actuation circuit comprises one or more data interfaces with one or more components which are external to the actuation circuit,
wherein the one or more data interfaces are provided with a galvanic isolating device.

11. The actuation circuit as claimed in claim 2, wherein the actuation circuit comprises one or more data interfaces with one or more components which are external to the actuation circuit,
wherein the one or more data interfaces are provided with a galvanic isolating device.

12. The actuation circuit as claimed in claim 3, wherein the actuation circuit comprises one or more data interfaces with one or more components which are external to the actuation circuit,
wherein the one or more data interfaces are provided with a galvanic isolating device.

13. The actuation circuit as claimed in claim 4, wherein the actuation circuit comprises one or more data interfaces with one or more components which are external to the actuation circuit,
wherein the one or more data interfaces are provided with a galvanic isolating device.

14. The actuation circuit as claimed in claim 6, wherein the actuation circuit comprises one or more data interfaces with one or more components which are external to the actuation circuit,
wherein the one or more data interfaces are provided with a galvanic isolating device.

15. The actuation circuit as claimed in claim 1, wherein the control unit is implemented on a complex programmable logic device.

16. The actuation circuit as claimed in claim 1, wherein the actuation circuit comprises a linear controller, which is configured to generate a supply current at a supply voltage for the control unit from direct current at the intermediate circuit voltage.

17. An on-board system for a vehicle which is propelled by an electrical machine, wherein the on-board system comprises:

an electrical energy store configured to deliver direct current at a first voltage;

an inverter configured to convert direct current at the first voltage into alternating current by which an electrical machine of a vehicle is operated;

a back-up capacitor arranged in parallel with one input of the inverter; and an actuation circuit for the inverter, wherein the actuation circuit comprises:

a direct voltage converter configured to convert direct current at the first voltage into direct current at an intermediate circuit voltage, a driver unit configured to generate, based on direct current at the intermediate circuit voltage, inverter control signals to switch elements of the inverter, and wherein the driver unit comprises at least one transformer circuit which is configured to generate, from direct current at the intermediate circuit voltage, different potentials for at least one of the inverter control signals, a discharge unit supplied with direct current at the intermediate circuit voltage, wherein the discharge unit is configured to switch, in response to a discharge control signal, a discharge resistor in parallel to an output of the direct voltage converter, and a control unit supplied with direct current at the intermediate circuit voltage, wherein the control unit is configured to generate, for the discharging of the back-up capacitor, a discharge control signal that causes the discharge unit to switch the discharge resistor in parallel to the output of the direct voltage converter.

* * * * *